United States Patent
Artinian et al.

[11] Patent Number: 5,939,800
[45] Date of Patent: Aug. 17, 1999

[54] AIRCRAFT ELECTRICAL POWER SYSTEM INCLUDING AIR CONDITIONING SYSTEM GENERATOR

[75] Inventors: Vatche Artinian, Long Beach; Terry Brim, Redondo Beach; Dan Matulich, Rolling Hills Estates; Roger Murry, San Pedro, all of Calif.

[73] Assignee: AlliedSignal Inc., Morristown, N.J.

[21] Appl. No.: 09/022,198

[22] Filed: Feb. 11, 1998

[51] Int. Cl.⁶ .................................................. H02J 9/06
[52] U.S. Cl. ............................ 307/64; 307/73; 454/72; 244/53 R
[58] Field of Search ........................ 307/64, 66, 73; 454/72; 62/172; 244/53 R

[56] References Cited

U.S. PATENT DOCUMENTS

| | | |
|---|---|---|
| 3,024,624 | 3/1962 | Morley et al. . |
| 4,091,613 | 5/1978 | Young ........................................ 454/72 |
| 4,434,624 | 3/1984 | Cronin et al. ............................ 62/172 |
| 4,494,372 | 1/1985 | Cronin . |
| 4,684,081 | 8/1987 | Cronin . |
| 5,114,103 | 5/1992 | Coffinberry . |
| 5,143,329 | 9/1992 | Coffinberry . |
| 5,235,803 | 8/1993 | Rodgers .................................. 60/39.07 |
| 5,442,905 | 8/1995 | Claeys et al. . |
| 5,722,229 | 3/1998 | Provost .................................. 60/39.07 |

OTHER PUBLICATIONS

USSN 08/987,737 filed on Dec. 9, 1997 and entitled Environmental Control System including Air Cycle Machine and Electrical Machine.

*Primary Examiner*—Albert W. Paladini
*Attorney, Agent, or Firm*—Robert Desmond, Esq

[57] ABSTRACT

An electrical power system for an aircraft includes an ac generator bus, an air conditioning system ("ACS") generator and a main engine generator. The ACS generator supplies primary ac power to the bus while the frequency of the ac power is within a frequency range. If the frequency of the ac power goes outside the frequency range, the main engine generator supplies backup ac power to the bus. The frequency of the ac power generated the ACS generator is maintained between upper and lower limits. Such ac power can be used directly by certain ac loads onboard the aircraft. Other ac loads onboard the aircraft are supplied with fixed frequency ac power by reduced-size inverters.

17 Claims, 5 Drawing Sheets

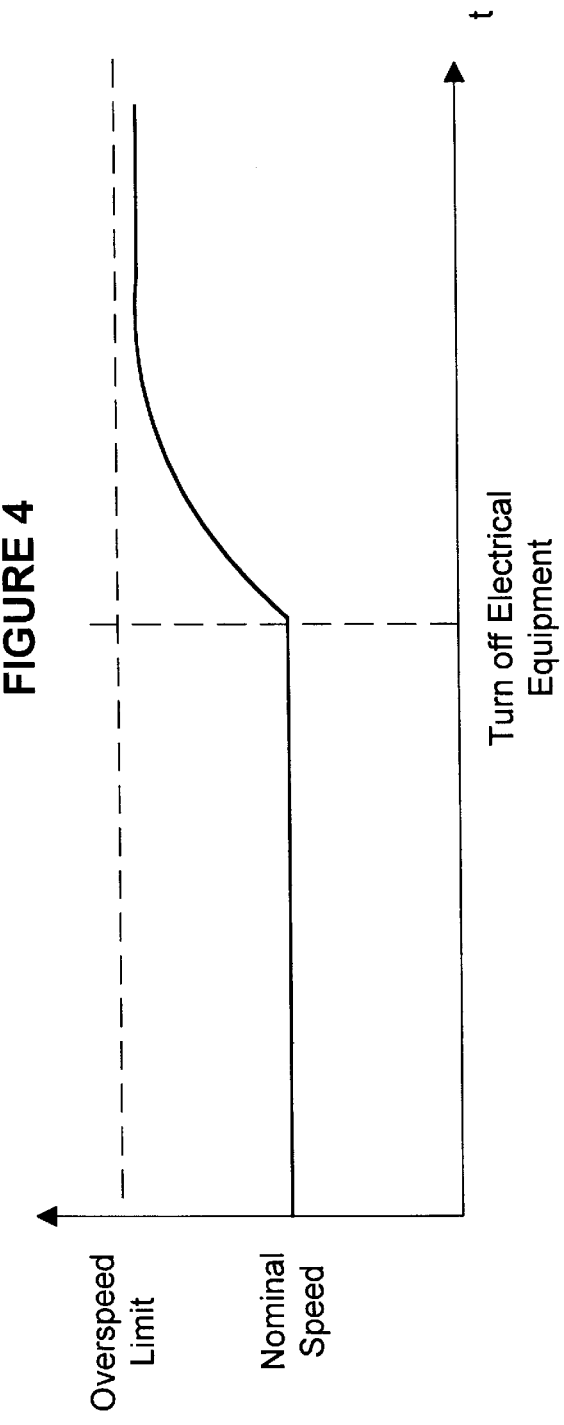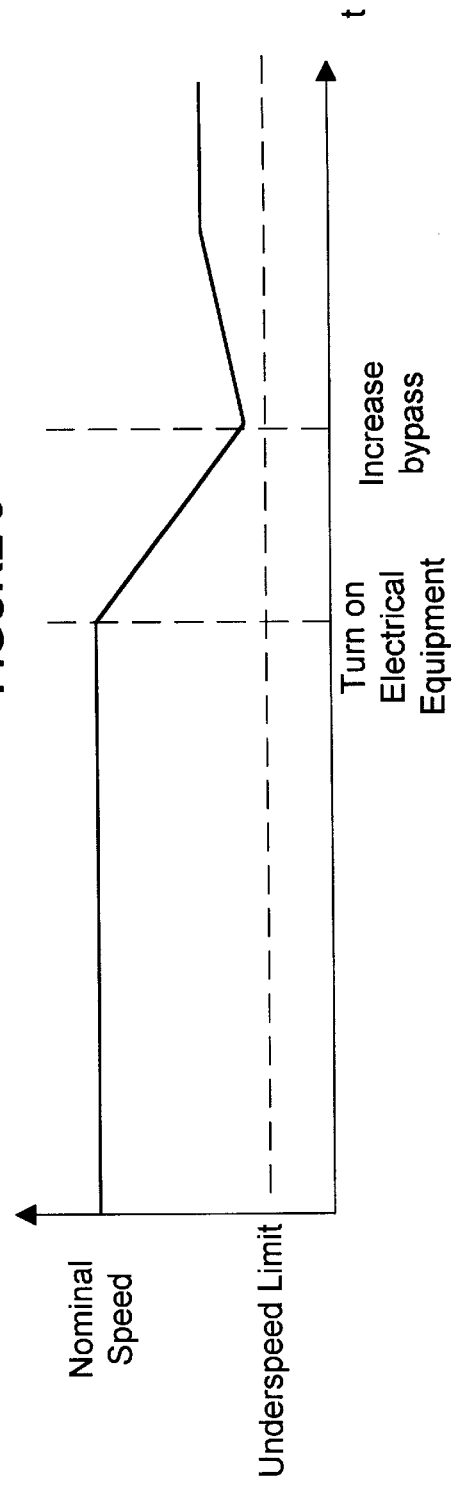

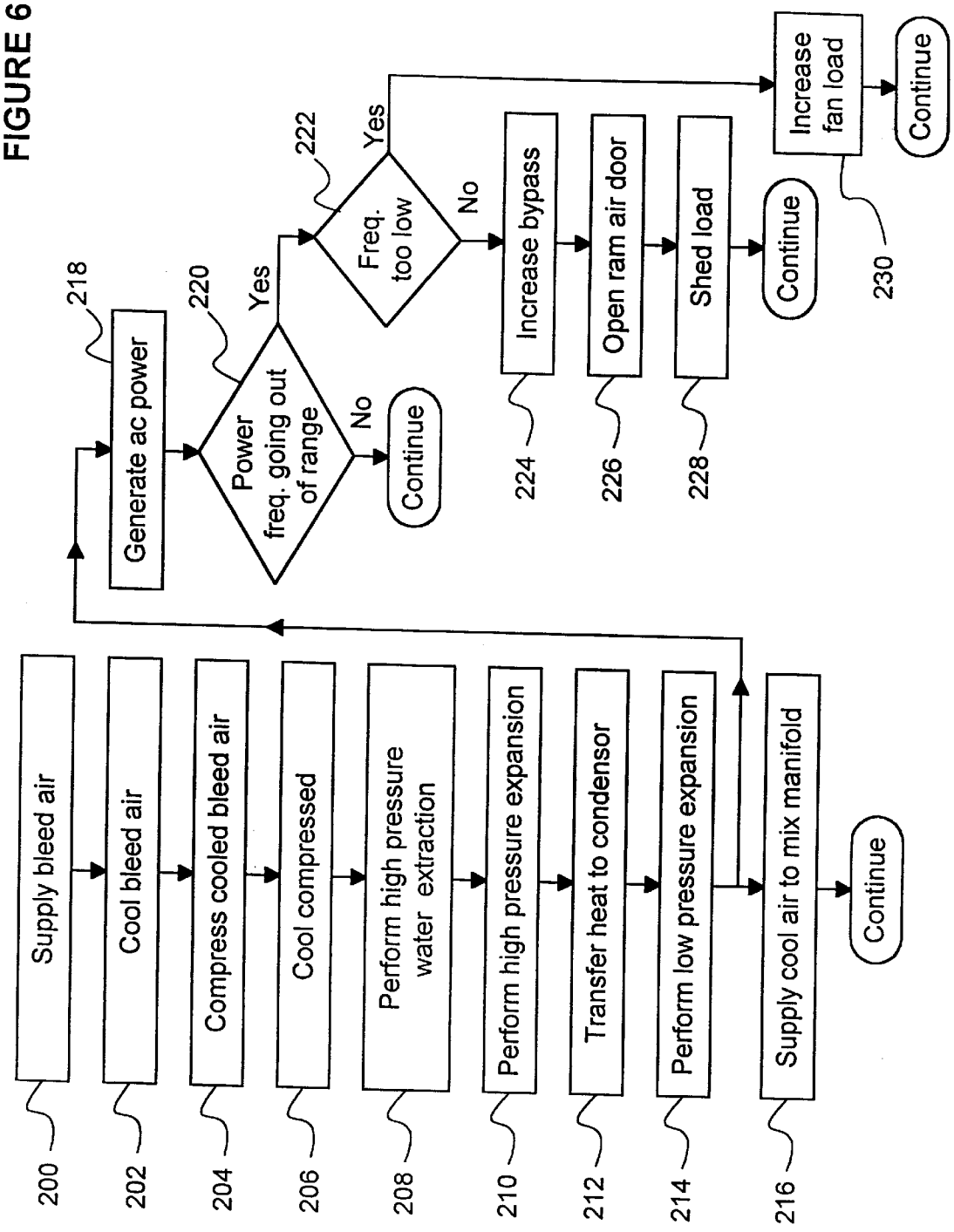

AIRCRAFT ELECTRICAL POWER SYSTEM INCLUDING AIR CONDITIONING SYSTEM GENERATOR

BACKGROUND OF THE INVENTION

The invention relates to electrical power systems for aircraft. More specifically, the invention relates to an aircraft electrical power system including an air conditioning system generator.

In an electrical power system of an aircraft, electrical equipment onboard the aircraft is typically connected to one or more electrical buses, and electricity is supplied to the buses by electrical generators that are driven by the aircraft's main engines. When a piece of equipment such as a galley oven is turned on, it uses electrical power. As the generator delivers the power to the piece of equipment, it places a load on the main engine. Consequently, the main engine is forced to work harder and burn additional fuel. This increase in fuel consumption results in higher operating costs for the aircraft.

The electrical power system also includes power conditioning electronics, which adds weight to the aircraft. The main engine generators are operated at variable speeds (due to varying shaft speed of the main engine) and therefore supply ac power at variable or "wild" frequencies. However, the electrical equipment typically runs on dc power or ac power at a fixed frequency such as 115 vac at 400 Hz. Typically, a rectifier unit is used for converting the ac generator power to dc power, and an inverter is used for converting the dc power to ac power having a fixed frequency. An inverter might add ninety pounds of weight to the aircraft. The added weight also increases the fuel consumption.

Additionally, the inverter is expensive. An inverter might cost more than ten thousand dollars.

There is a need to reduce fuel consumption and costs associated with the electrical power system of an aircraft.

SUMMARY OF THE INVENTION

Fuel consumption and costs are reduced by the present invention, which can be regarded as an electrical power system for an aircraft. The electrical power system includes an ac generator bus; an air conditioning system generator operable to provide primary ac power at variable frequencies; and a main engine generator operable to provide backup ac power at variable frequencies. An output of the air conditioning system generator is connected to the ac generator bus while the ac generator power is within a frequency range. An output of the main engine generator is selectively connected to the ac generator bus to provide backup power for the air conditioning system generator. Because the main engine generator merely supplies backup power, the main engine is not loaded as frequently. Consequently, fuel consumption of the main engine is reduced.

BRIEF DESCRIPTION OF THE DRAWINGS

FIGS. 4 and 5 are plots of shaft speed versus time for a second spool under different load conditions of the air conditioning system; and FIG. 6 is a flowchart of a method of operating the air conditioning system.

DETAILED DESCRIPTION OF THE INVENTION

Figure 1:
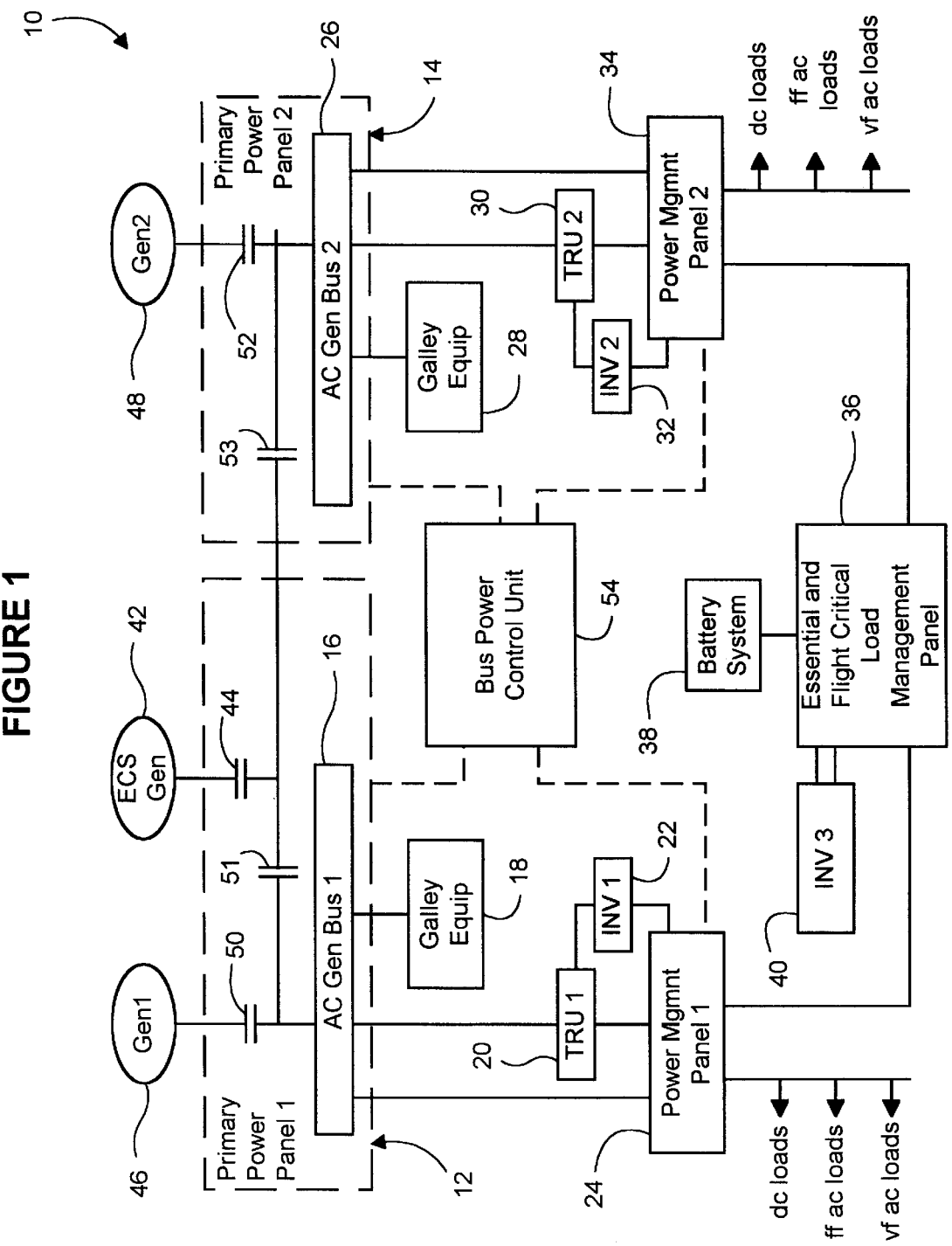
FIG. 1 is a schematic diagram of an aircraft electrical power system according to the present invention.

FIG. 1 shows an electrical power system 10 for an aircraft. The system 10 includes first and second primary power panels 12 and 14, which provide primary power distribution to the aircraft. The first primary power panel 12 includes a first ac generator bus 16, which includes conductors such as copper wires embedded in the hull of the aircraft and buried under panels in the aircraft cabin. The first ac generator bus 16 receives ac power at variable frequencies and supplies the variable frequency ac power to frequency insensitive galley equipment 18 such as galley ovens and chillers. The first ac generator bus 16 also supplies variable frequency ac power to a first transformer-rectifier unit ("TRU") 20, which steps down the ac power and converts the stepped down power to dc power. A first static inverter 22 converts dc power from the first TRU 20 into fixed frequency ac power. The fixed frequency ac power from the inverter 22, the dc power from the first TRU 20 and the variable frequency ac power from the first ac generator bus 16 are supplied to a first power management panel 24. The first power management panel 24 includes a plurality of power relays that can be controlled manually or automatically to provide secondary power distribution to the aircraft. The first power management panel 24 distributes fixed frequency ac power to loads such as hydraulic pumps, fuel pumps, environmental controls, recirculation fans and galley fans. Further, the first power management panel 24 distributes dc power to loads such as communication and navigation equipment and dc instrumentation and electronics. Still further, the first power management panel 24 distributes variable frequency ac power to loads such as ac lighting, gasper fans, and ice and rain protection equipment. The first power management panel 24 also includes a plurality of circuit breakers for line and load fault protection.

The second primary power panel 14 includes a second ac generator bus 26, which provides variable frequency ac power to additional galley equipment 28, a second TRU 30 and second power management panel 34. A second static inverter 32 converts dc power from the second TRU 30 into fixed frequency ac power. The second power management panel 34 provides secondary power distribution of variable frequency ac power from second ac generator bus 24, dc power from the second TRU 30 and fixed frequency ac power from the second inverter 32. The second primary power panel 14, the second TRU 30, the second inverter 32 and the second power management panel 34 can provide system redundancy, which increases reliability of the system 10.

The ac generator buses 16 and 26 handle ac power having a limited range of frequencies. For example, the frequency of the ac power can be between 400 Hz and 800 Hz. Powering certain equipment at variable frequencies and other equipment at a fixed frequency allows the size and weight of the static inverters 22 and 32 to be reduced because the static inverters 22 and 32 do not have to supply ac power to all of the equipment. For certain aircraft, it is believed that the static inverters 22 and 32 can be reduced in size by as much as 70 percent.

An Essential and Flight Critical Load Management Panel 36 provides ac and dc power to selected flight instruments in the event primary power is lost. The dc power is supplied by a battery system 38, and the ac power is supplied by a combination of the battery system 38 and a third static inverter 40. The third static inverter 40 converts the dc power from the battery system 38 to fixed frequency ac power.

Primary power is supplied to either the first or second ac generator bus 16 or 26 by a generator 42, which forms a part of an aircraft air conditioning system ("ACS"). The ACS generator 42 is operable to provide ac power at variable frequencies, which is controlled within a limited range. Having a four-pole design and a maximum speed of 24000 rpm, for example, the ACS generator 42 can produce ac power having a frequency between 400 Hz and 800 Hz. The ACS generator 42 is sized to provide full bus loads at all times to either the first or second ac generator bus 16 or 26. During normal operating conditions, the ACS generator 42 is selectively connected to one of the first and second ac generator buses 16 and 26 by a first power relay 44 and either a second or third power relay 51 or 53.

Primary power is supplied to the other of the first and second ac generator buses 16 and 26 by closing either a fourth of fifth power relay 50 or 52 to connect one of the aircraft's two main engine generators 46 or 48. When backup power is needed for the ACS generator 42, the main engine generators 46 and 48 are connected to the first and second generator buses 16 and 26, respectively, by closing the fourth and fifth power relays 50 and 52 and opening the first power relay 44. Typically, there will be a main engine generator 46 or 48 corresponding to each main engine of the aircraft, and an ac generator bus 16 or 26 corresponding to each main engine generator 46 or 48. Each main engine generator 46 and 48 is operable to provide ac power having a limited frequency range. Having a 4-pole design and a maximum speed of 24000 rpm, each main engine generator 46 and 48 can operate between 50% and 100% of maximum speed and produce ac power between 400 Hz and 800 Hz.

Such an electrical power system 10 offers increased reliability due to the additional redundancy between the main engine generators 46 and 48 and the ACS generator 42. Such an electrical power system 10 also reduces aircraft fuel consumption because the ACS generator 42, not a main engine generator 46 or 48, is providing primary ac power to one of the ac generator buses 16 or 26.

The electrical power system 10 further includes a bus power control unit ("BPCU") 54 for controlling the power relays 44, 50, 51, 52 and 53 to connect either the ACS generator 42 or one of the main engine generators 46 and 48 to the first and second ac generator buses 16 and 26. In addition to controlling the power relays 44, 50, 51, 52 and 53, the BPCU 54 controls the relays in the first and second power management panels 24 and 34 and the Essential and Flight Critical Load Management Panel 36. The BPCU 54 also collects and transmits diagnostic information to the aircraft's information system.

Figure 2:
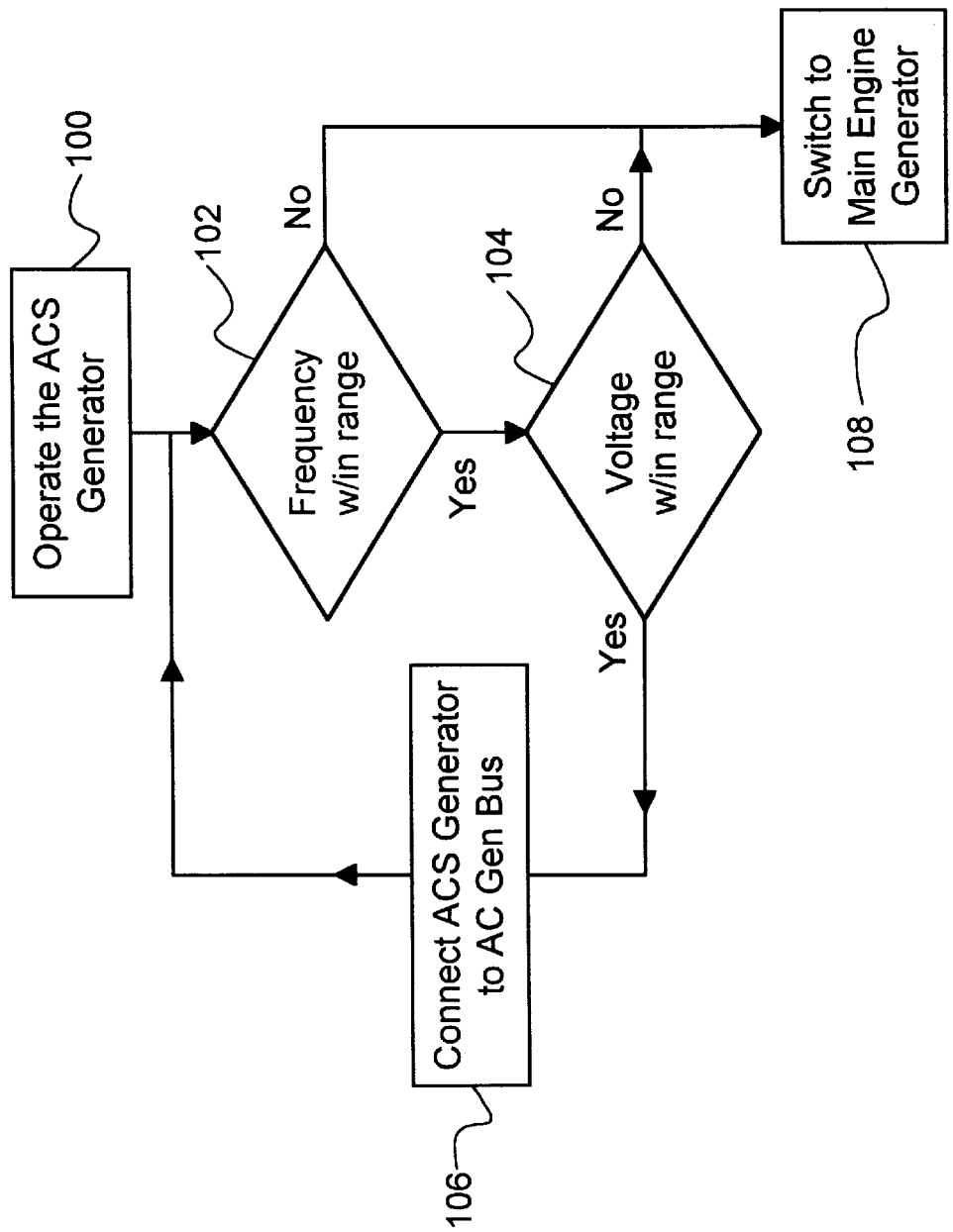
FIG. 2 is a flowchart of a method of generating electrical power for an aircraft.

FIG. 2 shows control logic implemented by the BPCU 54. The ACS generator 42 is driven by the aircraft air conditioning system when, for example, the aircraft air conditioning system is receiving bleed air from an APU or one of the main engines 46 or 48 (block 100). The ACS generator 42 is driven at variable speeds and, therefore, generates ac power having a range of frequencies.

When the BPCU 54 detects that both the frequency and voltage of the ac power are within acceptable limits (blocks 102 and 104), the BPCU 54 commands the power relays 44, 50, 51, 52 and 53 to connect the ACS generator 42 and one of the main engine generators 46 or 48 to the first and second ac generator buses 16 and 26 (block 106). When the BPCU 54 detects that either the frequency or the voltage goes out of range (blocks 102 or 104), the BPCU 54 commands the power relays 44, 50, 51, 52 and 53 to disconnect the ACS generator 42 and connect both of the main engine generators 46 and 48 to the first and second ac generator buses 16 and 26 (block 108).

Figure 3:
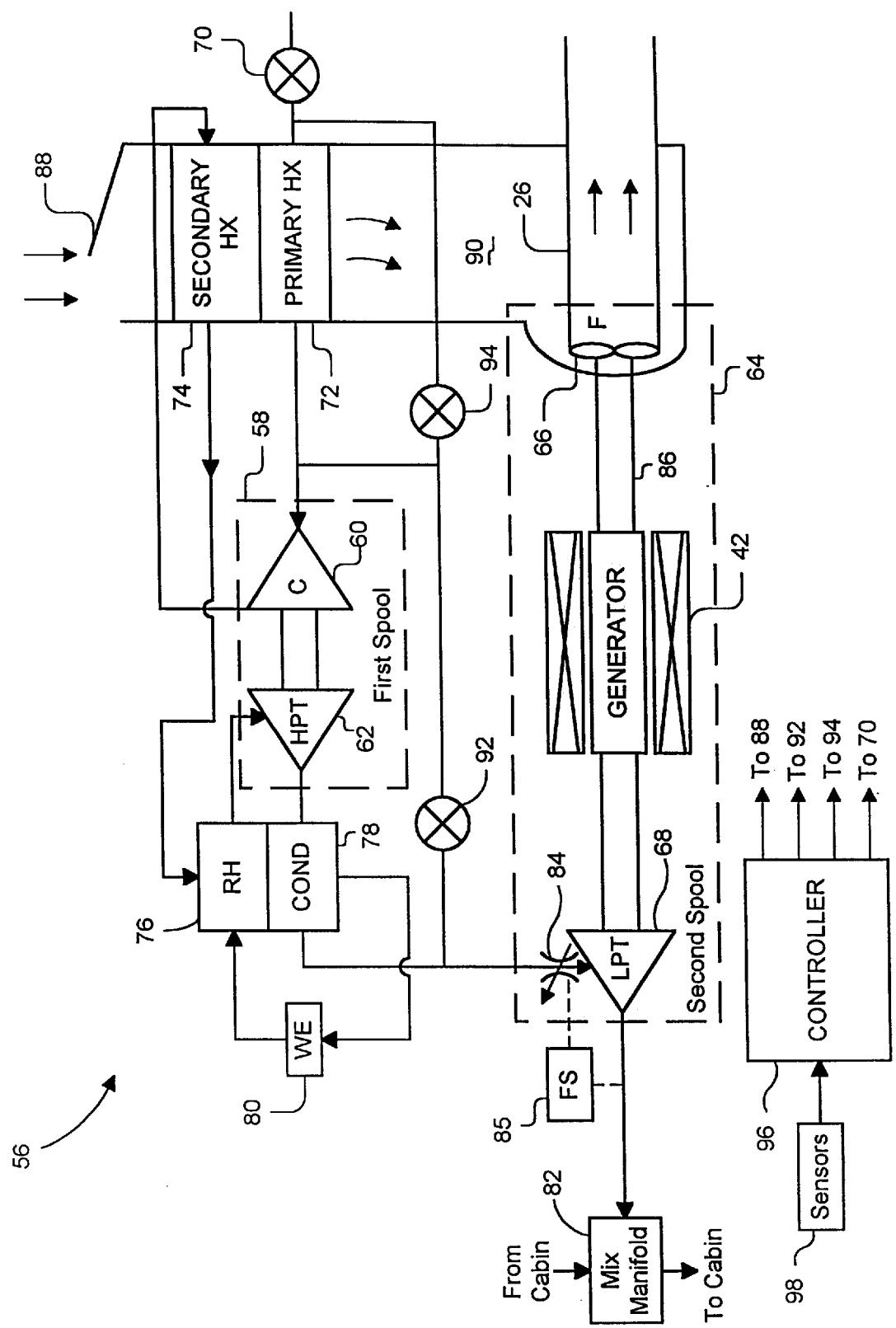
FIG. 3 is a schematic diagram of an aircraft air conditioning system including an electric generator, the generator forming a part of the electrical power system shown in FIG. 1.

FIG. 3 shows the ACS generator 42 as part of an aircraft air conditioning system ("ACS") 56. The ACS 56 includes two spools: a first spool 58 including a compressor 60 and a high pressure turbine 62, and a second spool 64 including a fan 66, the ACS generator 42 and a low pressure turbine 68. The ACS 56 is typically located in the belly or tail cone of the aircraft.

Bleed air from a compressor stage of an aircraft engine, an auxiliary power unit or a ground cart (not shown) is supplied via a shutoff valve 70 to a hot side of a primary air-to-air heat exchanger 72. In the primary air-to-air heat exchanger 72, heat of compression is removed from the bleed air and dumped to ambient.

Hot side outlet air of the primary heat exchanger 72 is compressed by the compressor 60 and supplied to a hot side of a secondary heat exchanger 74. In the secondary air-to-air heat exchanger 74, heat of compression is removed and dumped to ambient. The compressor 60 provides an air cycle lift, which allows the primary heat exchanger 74 to be smaller.

High pressure water separation is then performed. Air leaving the hot side of the secondary air-to-air heat exchanger 74 is supplied to a hot side of a reheater 76, where additional heat is removed. Air leaving the hot side of the reheater 76 is supplied to a hot side of a condenser 78, which causes moisture entrained in the air to form condensate. Higher pressure resulting from the compressor 60 enhances the formation of condensate and reduces the presence of vapor in the air.

Air leaving the condenser 78 is supplied to a water extractor 80. Inside the water extractor 80, a vaned swirl section centrifuges the condensate against a duct wall, causing the condensate to be trapped in an annular space formed by a duct wall liner that begins downstream of the vaned swirl section. The duct wall liner isolates dehumidified air from moisture-laden air in the annular space. The condensate trapped in the annular space is collected by a sump that is several duct diameters downstream of the vanes. The condensate collected by the sump is sprayed at a ram air inlet of the secondary heat exchanger 74.

Dehumidified air leaving the water extractor 80 is supplied to a cold side of the reheater 76 and reheated. Reheating puts more energy into the dehumidified air, which allows for greater cooling in the high pressure turbine 62. Additionally, reheating increases turbine reliability by minimizing the formation of ice on the wheel of the high pressure turbine 62.

Air leaving the hot side of the reheater 76 is expanded in the high pressure turbine 62 and cooled to a temperature between 0° F. and 50° F. Shaft power resulting from the expansion in the high pressure turbine 62 is used to drive the compressor 60. Air leaving the high pressure turbine 62 is supplied to a cold side of the condenser 78, where additional energy from a roughly 50° F. rise in temperature is put into the air. Such reheating increases cooling and reliability of the low pressure turbine 68. Air leaving the cold side of the condenser 78 is expanded in the second cooling turbine 68 and cooled to sub-freezing temperatures.

The sub-freezing air of the low pressure turbine 68 is supplied to a mix manifold 82. Inside the mix manifold 82, the subfreezing air is mixed with air from the aircraft cabin. Cool, conditioned air leaving the mix manifold 82 is supplied to the aircraft cabin.

The low pressure turbine 68 has a variable geometry inlet nozzle 84, which optimizes airflow and power extraction. The area of the nozzle 84 is adjustable to control the flow of cooled, conditioned air into the cabin as the cabin pressure and bleed air pressure change. When pressure is increased, air density becomes higher and, therefore, less volumetric flow is needed to achieve the same mass flow through the cabin. Therefore, area of the nozzle 84 is decreased. Conversely, the area of the nozzle 84 is increased when pressure is decreased. A flow sensor 85 provides feedback to the nozzle 84 for the adjusting the nozzle area.

Shaft power resulting from the expansion in the low pressure turbine 68 is used to drive the fan 66 and the ACS generator 42. The ACS generator 42 is a voltage-regulated, variable frequency generator such as a traditional wound rotor rotating rectifier machine that supplies constant voltage at variable speed. Such a machine is an industry standard for aircraft power generation. The wound rotor is mounted directly to a common shaft 86 and driven at shaft speeds, without the need for a gearbox. In the alternative, the ACS generator 42 could be a Rice machine or a homopolar machine.

When ac power is extracted from the ACS generator 42 (for example, by turning on a piece of electrical equipment), a load is placed on the shaft 86. The load is transmitted by the shaft 86 to the fan 66 and the lower pressure turbine 68.

The ACS generator 42 is driven by the low pressure cooling turbine 68 at variable speeds because generator load and bleed flow conditions change during the flight of the aircraft. For example, the ACS generator 42 might be operated between 50% and 100% of maximum speed. Consequently, the ACS generator 42 generates ac power having a variable frequency and constant voltage. The variable frequency, constant voltage ac power is extracted from the ACS generator 42 and supplied directly to either the first or second ac generator bus 16 or 26.

The fan 66 draws ambient air through a ram air door 88, into a supply plenum 90 and through the heat exchangers 72 and 74. Heat is carried away from the heat exchangers 72 and 74 and dumped to ambient. A check valve (not shown) allows air to flow around the fan 66, if necessary. The fan 66 provides the sole source of cooling air for the heat exchangers 72 and 74 while the aircraft is on the ground. Therefore, the fan 66 is designed for maximum efficiency at a minimum operating speed (e.g., 50% of maximum speed).

The fan 66 has a load line that follows a speed-cubed characteristic. When the shaft speed of the second spool 64 increases above a nominal design speed, the fan load increases as a non-linear function of the shaft speed.

The speed-cubed characteristic of the fan 66 is advantageously used to create a balanced load-sharing between the ACS generator 42 and the fan 66. While energy is being extracted from the ACS generator 42, a generator load is placed on the shaft 86. When the load is shed (for example, by turning off a galley oven), speed of the shaft 86 begins to increase. However, the increase in shaft speed causes the fan load to increase non-linearly and ultimately limit the shaft speed. The shaft speed is inherently maintained below an upper limit without the need for a speed governor or any other active speed control. When the ACS generator load is reapplied, the shaft speed and fan load are decreased. Thus, an upper limit can be set by proper design of the fan 66.

Speed of the shaft 86 and, therefore, frequency of the ac power generated by the ACS generator 42 can be maintained above a lower limit by a bypass valve 92. The bypass valve 92 is coupled between a hot side outlet of the primary heat exchanger 72 and an inlet of the low pressure turbine 68.

When the shaft speed is approaching the lower limit, the bypass valve 92 is opened to increase the pressure to the low pressure turbine 68 and thereby increase the speed of the ACS generator 42 above the lower limit. Since the high pressure turbine 62 is bypassed, the benefit of cascading the high pressure cooling turbine 62 (i.e., greater air cycle lift) is lost. However, the ram air door 88 is opened to allow for more cooling by the heat exchangers 72 and 74. The increase in heat transfer to ram air lowers the temperature of the bleed air leaving the heat exchangers 72 and 74 and, therefore, partially compensates for the loss of cycle lift. The variable nozzle 84 is opened somewhat to allow for a constant supply of air to the cabin.

When shaft speed is approaching the upper limit, the pressure supplied to the low pressure power turbine 68 is lowered by closing down the bypass valve 92 and diverting additional air through the first spool compressor 60 and high pressure turbine 62. Consequently, compressor work increases the air cycle lift. The ram air door 88 is closed down to limit the flow of cooling air across the heat exchangers 72 and 74, as the cycle lift would otherwise make the air leaving the mix manifold 82 too cold. The variable nozzle 84 is opened somewhat to allow for a constant supply of air to the cabin.

Reference is now made to FIG. 4, which shows an example of shaft speed of the second spool 64 being kept below an overspeed limit. Assume that the second spool 64 is operating at a nominal speed with the galley oven turned on. That is, the second spool 64 is operating at nominal speed while the ACS generator 42 is placing a large load on the shaft 86. When the galley oven is turned off, the large ACS generator load is shed and the speed of the second spool 64 begins to increase. However, the speed of the fan 66 also begins to increase. Additionally, the fan load on the shaft 86 begins to increase as a function of speed-cubed. As the fan load is increased, the overspeed limit is approached, but not exceeded.

Reference is now made to FIG. 5, which shows an example of shaft speed of the second spool 64 being kept above an underspeed limit. Assume that the second spool 64 is operating at a nominal speed with the galley oven turned off. When the galley oven is turned on, the ACS generator 42 places a large load on the shaft 86, causing the shaft speed begins to decrease. The bypass valve 92 is opened fully to provide bottoming control and keep the shaft speed of the second spool 64 above the underspeed limit. After the bypass valve 92 is opened, the shaft speed begins to increase. The underspeed limit is approached, but never reached. Cabin temperatures are kept at comfortable levels by opening the ram air door 88.

Returning to FIG. 3, the ACS 56 also includes a temperature control valve 94, which allows a portion of the bleed air to bypass the primary heat exchanger 72 on cold days or in full heating mode. The temperature control valve 94 allows the temperature of the air leaving the mix manifold 82 to be increased. Additionally, the temperature control valve 94 provides protection against temperatures dropping to subfreezing levels in the water extractor 80.

A controller 96 receives signals from sensors 98 such as a shaft speed sensor and temperature sensors indicating temperatures of air entering the water extractor 80, air leaving the low pressure turbine 68 and air leaving the compressor 60. The shaft speed sensor signal allows for control of the shaft speed and, therefore, ac power frequency. The temperature sensor signals allow for basic temperature control as well as protection against system icing and compressor overtemperature. In response to the sensor signals, the controller 96 controls the ram air door 88, the bypass valve 92, and the temperature control valve 94. The controller 96 also controls the shutoff valve 70.

FIG. 6 illustrates the air cycle of the ACS 56. Bleed air is supplied to the primary heat exchanger 72 (block 200) and cooled (block 202). The cooled bleed air is compressed by the compressor 60 (block 204) and cooled again in the secondary heat exchanger 74 (block 206). High pressure water extraction is performed on the air leaving the secondary heat exchanger 74 (block 208), and the resulting dehumidified air is expanded and cooled in the high pressure turbine 62 (block 210). Heat is transferred to the condenser 78 (block 212), giving a cycle lift. Air leaving the condenser 78 is expanded and further cooled to subfreezing temperatures in the low pressure turbine 68 (block 214). The subfreezing air is supplied to the mix manifold 82, and a mixture of the subfreezing air and cabin air is supplied to the aircraft cabin. The cycle continues.

Shaft power is created by the expansion of air in the low pressure turbine 68. The shaft power, in turn, causes the ACS generator 42 to generate ac power (block 218). Varying shaft speeds will result in ac power having varying frequencies. When the shaft speed of the second spool 64 and, therefore, the frequency of the ac power is going too low (blocks 220 and 222), the bypass valve is opened (block 224). Since the high pressure turbine 62 is being bypassed, the ram air door 88 is opened to increase cooling (block 226). If the frequency of the ac power is still too low, a load on the ACS generator 42 can be shed by turning off electrical equipment (block 228). Although the underspeed limit is approached, it is never reached. The ACS generator 42 continues generating ac power.

When the shaft speed of the second spool 64 and, therefore, the frequency of the ac power is going too high (blocks 220 and 22), the fan load increases as a function of speed-cubed (block 230). The overspeed limit is approached but, due to the rapidly increasing fan load, it is never reached. The ACS generator 42 continues generating ac power.

Actual control of the bypass valve 92, temperature control valve 94 and ram air door 88 will depend upon flight and electrical load conditions. In situations where maximum refrigeration is required, the bypass valve 92 and the ram air door 88 can be fully opened by the controller 96. In situations where the temperature of the ambient air is cool and refrigeration is not required, the ACS 56 will deliver electricity and warmer air, as required. The controller 96 will open the temperature control valve 94 or open the bypass valve 92.

In a large commercial aircraft, cooling is more difficult to perform during ground operation because the fan 66 supplies all of the cooling air. During flight, however, ram air pressure provides all of the cooling flow needed, which allows the high pressure turbine 62 to be bypassed. At altitudes below the cloud tops, where ambient moisture could be present, all of the cycle air passes through the first spool 58 and the high pressure water extraction loop.

The ACS 56 can be run on the ground on a hot day when the main engines are off and still meet certain cooling requirements. This is called an Auxiliary Power Unit ("APU") condition. The APU supplies refrigerated air to the cabin and electricity to the aircraft. The APU shaft load shifts to the compressor which must deliver higher bleed pressures in order for the ACS 56 to provide both air conditioning and electricity. For electric power generation only, the load compressor bleed pressure is dropped to an unloaded condition using inlet guide vanes. The ACS 56 operates in a high pressure spool bypass to deliver ambient temperature ventilation air to the cabin.

Thus disclosed is an aircraft electrical power system that uses an ACS generator as a primary source of electrical power and one of the main engine generators for backup power. Consequently, fuel consumption of the aircraft is reduced.

Fuel consumption is also reduced because the weight of the inverters is reduced. Because the ACS generator can provide usable ac power directly to as much as 70% of ac loads onboard the aircraft, smaller inverters can be used for supplying fixed frequency ac power to the remaining ac loads. Consequently, the weight of the inverter can be reduced by as much as 70 percent.

The electrical power system provides greater reliability because it uses voltage-regulated, variable frequency generator instead of an "Integrated Drive" that runs at constant speed. Additionally, the electrical power system offers redundancy between the ACS generator and the main engine generator. If the ACS generator goes down, the main engine generator can provide backup.

The electrical power system is especially useful for commercial aircraft. However, it can also be applied to regional, corporate and military aircraft.

The invention is not limited to the specific embodiments described above. For example, an electrical power system for a large commercial aircraft having four main engines and two air conditioning systems could include an ac generator bus for each engine and two ACS generators for supplying primary power to two of the four buses. Instead, the invention is limited only by the claims that follow.

We claim:

1. An electrical power system for an aircraft, the electrical power system comprising:

an ac generator bus;

an ACS generator operable to provide primary ac power at variable frequencies;

first means for connecting an output of the ACS generator to the ac generator bus while the ac generator power is within a frequency range;

a main engine generator operable to provide backup ac power at variable frequencies; and second means for connecting an output of the main engine generator to the ac generator bus to provide backup power for the ACS generator.

2. The system of claim 1, further comprising an additional ac generator bus, an additional main engine generator, and means for connecting an output of the additional main engine generator to the additional ac generator bus.

3. The system of claim 1, wherein the ACS generator is a regulated variable frequency, constant voltage generator.

4. The system of claim 1, wherein the ACS generator includes a wound rotor rotating rectifier machine.

5. The system of claim 1, wherein the ACS generator is part of an air conditioning system, and wherein the air conditioning system includes means for controlling the ACS generator to maintain the primary ac power within the limited range.

6. The system of claim 1, wherein the first and second means collectively include a controller and a plurality of relays, the controller causing the relays to connect the output of the ACS generator to the ac generator bus while the ac generator power is within the frequency range, the controller causing the relays to connect the output of the main engine generator to the ac generator bus while the primary ac power is outside a specified range.

7. The system of claim 1, further comprising a first group of electrical equipment operable on ac power having frequencies within the range, wherein the ACS generator supplies electrical power directly to the first group of electrical equipment.

8. The system of claim 7, further comprising a second group of electrical equipment operable on ac power having a fixed frequency; means for converting the variable frequency ac power to dc power; and an inverter for converting the dc power to fixed frequency ac power, the inverter being sized to supply the fixed frequency ac power to the second group of electrical equipment.

9. An electrical power system for an aircraft, the electrical power system comprising:

a first ac generator bus;

a second ac generator bus;

a first main engine generator operable to provide variable frequency ac power;

a second main engine generator operable to provide variable frequency ac power;

an ACS generator operable to provide variable frequency ac power;

a plurality of relays; and a controller and for controlling the relays to connect an output of the ACS generator to one of the ac generator buses while the ac power from the ACS generator is within a frequency range, the controller controlling the relays to connect an output of one of the main engine generators to the other of the ac generator buses.

10. The system of claim 9, wherein the controller connects outputs of both main engine generators to the ac generator buses while the ac power from the ACS generator is outside the frequency range.

11. The system of claim 9, wherein the aircraft includes an air conditioning system, and wherein the ACS generator is operated by the air conditioning system.

12. The system of claim 9, further comprising a first group of electrical equipment operable on ac power having frequencies within the range, wherein the ACS generator supplies primary ac power directly to the first group of electrical equipment.

13. The system of claim 12, further comprising a second group of electrical equipment operable on ac power having a fixed frequency; means for converting the variable frequency ac power to dc power; and an inverter for converting the dc power to fixed frequency ac power, the inverter being sized to supply the fixed frequency ac power to the second group of electrical equipment.

14. A method of providing electrical power to an aircraft having an ac generator bus, a main engine generator and an air conditioning system including an ACS generator, the method comprising the steps of:

operating the air conditioning system, whereby the ACS generator generates ac power having a variable frequency;

determining whether the variable frequency ac power is within a frequency range;

supplying the variable frequency ac power to the ac generator bus while the variable frequency ac power is within the frequency range; and using the main engine generator to provide backup power for the ACS generator when the ac power from the ACS generator is out of specification.

15. The method of claim 11, wherein the main engine generator is used to provide the backup power while the variable frequency ac power is outside the specification.

16. The method of claim 11, wherein the air conditioning system is operated to maintain the variable frequency ac power within the specification.

17. The method of claim 14, wherein the aircraft has an additional ac generator bus and an additional main engine generator, and wherein the method further comprises the step of connecting an output of one of the main engine generators to the additional ac generator bus.

* * * * *